United States Patent Office 3,542,901
Patented Nov. 24, 1970

3,542,901
ORGANOSILICON COMPOSITIONS
Kenneth G. Cooper and Peter R. A. Hansen, Glamorgan, Wales, assignors to Midland Silicones Limited, Reading, England
No Drawing. Filed June 26, 1968, Ser. No. 740,065
Int. Cl. C08g 47/06
U.S. Cl. 260—825
7 Claims

ABSTRACT OF THE DISCLOSURE

A room temperature vulcanizing silicone rubber stock exhibiting improved low modulus and sealant properties is prepared by admixing a linear siloxane having di- or tri-functional endblocking units with a linear siloxane having chemically non-functional, inert endblocking units on one end of the polymeric molecule and di- or tri-functional endblocking units on the other end of the molecule.

This invention relates to organosilicon compositions. More particularly, it relates to organopolysiloxane compositions which are stable in the absence of moisture and which cure to elastomeric solids in the presence of moisture.

It has been known for some time that compositions containing linear organo-polysiloxanes having attached terminal alkoxy radicals can be cured to elastomeric solids in the presence of a catalyst and moisture. One method of employing these compositions consists of packaging the substantially anhydrous material in a sealed container, the material being removed from the container and exposed to atmospheric moisture in use. These so-called one-package, or one-component, type materials can be employed in a wide variety of applications and have been found to be particularly useful for sealing joints in structures of various kinds. However, for certain sealing applications, it has been found that the cured rubber is often too rubbery in nature because it has a high modulus. This property represents a significant disadvantage when the composition is employed as a building sealant. When applied as a sealant to buildings, the cured rubber can be subjected to large dimensional changes such as those caused by thermal expansion and contraction of the structures. The strains set up in the rubber by these dimensional changes are often severe enough to cause the rubber to rupture and thus become ineffective as a sealant.

We have now found that the above specified one component, room temperature vulcanizing compositions can be modified to provide compositions vulcanizable to low modulus rubbers and having improved performance as sealants.

Accordingly, this invention provides an organosilicon composition which is stable under anhydrous conditions and curable on exposure to moisture comprising (1) a polydiorganosiloxane component having a viscosity of at least 200 cs. at 25° C. and which contains (a) at least one polydiorganosiloxane in which the terminal organosilyl groups have the general formula —SiR$_a$(OR')$_{3-a}$, and (b) at least one polydiorganosiloxane having as the terminal organo-silyl groups both —SiR$_a$(OR')$_{3-a}$ groups and —SiR''$_3$ groups, wherein $a$ has a value of 0 or 1, each R and each R'' represent a monovalent hydrocarbon radical, a monovalent halohydrocarbon radical or a cyanoalkyl radical, and each R' represents an alkyl radical containing less than 6 carbon atoms, not more than 40 percent of the total terminal organosilyl groups in polydiorganosiloxanes (a) and (b) being —SiR''$_3$ groups, and (2) a curing catalyst for the polydiorganosiloxane component (1).

The polydiorganosiloxane component (1) of the compositions of this invention should have a viscosity of at least 200 cs. and preferably from about 2000 to about 20,000 cs. at 25° C. In most cases, the polydiorganosiloxane component (1) is preferably prepared or employed as a mixture of the polydiorganosiloxanes (a) and (b). Where (a) and (b) are incorporated separately into the curable composition, the viscosity of component (1) as referred to herein means the viscosity of the product which would be obtained on mixing together polydiorganosiloxanes (a) and (b). Preferably, the polydiorganosiloxanes (a) and (b) have viscosities which are approximately the same and within the range from 2000 to 20,000 cs. at 25° C.

The polydiorganosiloxanes which comprise component (1) should be composed mainly of diorganosiloxane units but it will be understood that SiO$_2$ and mono-organosiloxane units can also be present provided the amount of such units is not sufficient to affect the essentially linear characteristics of the polysiloxane. Some chain branching of the polydiorganosiloxane is, therefore, permissible provided the ratio of organic radicals to silicon atoms therein remains at approximately 2 and preferably from 1.95 to 2.005.

As the organic radicals in the polydiorganosiloxanes (a) and (b), there can be present radicals selected from monovalent hydrocarbon radicals such as methyl, ethyl, propyl, octadecyl, vinyl, allyl, cyclohexyl, phenyl, tolyl and benzyl radicals, monovalent halohydrocarbon radicals such as chloromethyl, bromophenyl and 3,3,3-trifluoropropyl radicals and cyanoalkyl radicals for example the cyanopropyl radical. More than one type of organic radical can be present in any given polymer if desired.

Preferably, the organic radicals comprise a major proportion of methyl radicals with or without minor proportions of phenyl, vinyl or trifluoropropyl radicals. The preferred polydiorganosiloxanes, therefore, are the methylpolysiloxane homopolymers or copolymers with, for example, methylvinylsiloxanes, methylphenylsiloxanes or methyltrifluoropropylsiloxanes, the said polymers and copolymers having attached thereto end-blocking units as herein described. Most preferred are the polydimethylsiloxanes.

The R and R'' radicals present in the defined endblocking units can also be selected from monovalent hydrocarbon radicals, monovalent halohydrocarbon radicals and cyanoalkyl radicals as hereinbefore exemplified.

As the R' radicals, there are employed alkyl radicals containing less than 6 carbon atoms. Preferably, the R' radicals are methyl or ethyl radicals.

The polydiorganosiloxane component (1) is characterised by having therein a proportion, up to 40 percent, of terminal, that is end-blocking, units of the formula —SiR''$_3$, the remaining end-blocking units comprising —SiR$_a$(OR')$_{3-a}$ units. It will, therefore, comprise (a) at least one polydiorganosiloxane wherein both terminal silicon atoms in the molecule have —(OR') radicals attached and (b) at least one polydiorganosiloxane in which one terminal silicon atom in the molecule has only —R'' radicals attached to the free valencies and the other terminal silicon atom has —OR radicals (optionally with one R radical) attached thereto. Arising from the method of preparation, there will usually also be present a proportion of diorganopolysiloxanes in which the free valencies of both terminal silicon atoms are satisfied solely with —R'' radicals. The mixture of polydiorganosiloxanes (a) and (b) can be prepared as such or can be obtained by separately preparing and thereafter mixing the appropriately end-blocked polymers.

Polydiorganosiloxanes (a) include those having the general formula

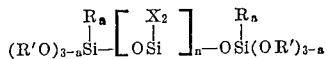

wherein $a$, R and R' have the values hereinbefore given, $n$ is an integer and wherein each X represents a monovalent hydrocarbon radical, monovalent halohydrocarbon radical or a cyanoalkyl radical. Polydiorganosiloxanes of this general formula can be prepared by the reaction of a mono-organotrialkoxy silane or a tetra-alkoxy silane with a polysiloxane containing terminal silicon-bonded hydroxyl radicals. Preferably such a reaction is performed in the presence of a catalyst, for example, an amine, or under other conditions which promote the reaction of $\equiv$SiOH and $\equiv$SiOR' to liberate an alcohol. Polydiorganosiloxanes of this type and methods for their preparation are described in the literature.

Also suitable as polydiorganosiloxanes (a) are polydiorganosiloxanes wherein the terminal silicon atoms having attached alkoxy radicals are linked to the remainder of the polysiloxane chain by means of a divalent hydrocarbon radical. Polysiloxanes of this type can be represented by the general formula

wherein $a$, $n$, R and R' are as hereinbefore defined and Y represents a divalent hydrocarbon radical, for example, the ethylene, propylene or butylene radicals. Such polydiorganosiloxanes are preferably prepared by the platinum-catalyzed addition of an alkoxy silane containing a silicon-bonded unsaturated radical, for example, the vinyl radical, to a polydiorganosiloxane containing terminal silicon-bonded hydrogen atoms.

As hereinbefore stated, the polydiorganosilicon component (1) can be prepared as the required mixture of polydiorganosiloxanes (a) and (b). When the terminal silicon atoms of the polydiorganosiloxane are joined to the remainder of the siloxane chain through siloxane linkeages, such a mixture is conveniently obtained by preparing a mixture of polymers containing the appropriate proportions of terminal silanol groups and terminal —SiR"$_3$ groups and thereafter reacting this mixture of polymers with an alkoxy silane.

Alternatively, the polydiorganosiloxane (1) can be obtained by separately preparing a polydiorganosiloxane containing alkoxy radicals attached to each terminal silicon atom and a polydiorganosiloxane or mixture of polydiorganosiloxanes in which one of the terminal groups is a —SiR"$_3$ group and thereafter mixing them in the proportions suitable for obtaining the desired modulus.

When the terminal silicon atoms of the polydiorganosiloxanes are attached to the siloxane chain through divalent hydrocarbon radicals, the desired proportion of terminal —SiR"$_3$ groups can be obtained by reacting a diorganosiloxane terminated with silicon-bonded hydrogen atoms with a mixture of an unsaturated alkoxy silane and a silane containing a silicon-bonded unsaturated radical in addition to the —R" radicals.

In the polydiorganosiloxane component (1) up to 40 percent of the total terminal organosilyl units can be —SiR"$_3$ groups. However, the proportion of the said —SiR"$_3$ groups preferably falls within the range from 2 to 25 percent of the total.

The catalyst (2) employed to cure the polydiorganosiloxane component (1) can be any material capable of promoting or facilitating the hydrolysis of silicon-bonded alkoxy radicals and the reaction between silicon-bonded hydroxyl radicals and silicon-bonded alkoxyl radicals. A wide variety of such catalyst materials are known including principally the metal salts of monocarboxylic acids such as lead octoate, stannous naphthenate, stannous octoate, dibutyltin dilaurate, dibutyltin dioctoate, dioctyl-tin diacetate, mixed dialkyltin alkoxy halides and zinc octoate. Also useful as catalysts are titanium esters and chelates such as tetrabutyl titanate, octylene glycol titanate, triethanolamine titanate, diisopropoxy titanium di(acetoacetonate), tetrakis(trimethylsiloxy) titanium and reaction products obtained by heating tetravalent titanium esters with dialkyltin dicarboxylates. Other, though less preferred, catalysts are the organic amines and amine salts such as di-n-butylamine, hexylamine, ethylene diamine and octadecylamine acetate. It is preferred to employ as the catalyst a titanium chelate such as di-isopropoxy titanium di(aceoacetonate) or di-isopropoxy titanium di(ethyl acetoacetate) such catalysts being particularly useful when it is desired to accelerate the cure of the composition by heating.

The proportion of catalyst employed is not narrowly critical and can vary with the type of catalyst. Normally, from 0.1 to 5 percent by weight based on the polydiorganosiloxane component (1) is sufficient.

If desired, the compositions of this invention can be modified by the addition of any of the fillers suitable for use in the formation of silicone elastomers. Such fillers include fume silicas, precipitated silicas, ground quartz, diatomaceous earths, zirconium silicate, barium zirconate, metal oxides and carbonates such as zinc oxide, barium oxide, titanium dioxide, ferric oxide, magnesium oxide and calcium carbonate and organic fillers such as carbon blacks and phthalocyanines. If necessary, the fillers, particularly the reactive silica, can be specially treated by contact with a silane or siloxane prior to use.

The compositions of this invention are particularly suitable for use as building sealants. They are, however, also useful in other applications where the presence of a rubber of reduced modulus is advantageous.

The following examples in which the parts are expressed as parts by weight illustrate the invention.

EXAMPLE 1

A polydiorganosiloxane (A) having two methoxy radicals and a methyl radical attached to each terminal silicon atom was prepared by reacting an alpha,omega-silanol end-stopped dimethylpolysiloxane with methyl trimethoxysilane. After removal of the excess silane from the product the polydiorganosiloxane had a viscosity of approximately 8000 cs. at 25° C.

By the reaction of octamethylcyclotetrasiloxane, water and hexamethyldisiloxane a polydimethylsiloxane was obtained containing silanol end groups and trimethylsilyl end groups. This polysiloxane was reacted with methyl-trimethoxysiloxane and the excess silane reactant removed by distillation. A mixture of polydimethylsiloxanes (B) was obtained which contained 14% of trimethylsilyl end groups and 86% of methyldimethoxysilyl end groups.

An anhydrous composition was prepared by thoroughly mixing 98 parts of polydimethylsiloxane (A), 42 parts of polydimethylsiloxane (B), 15 parts of a fume silica having a surface area of 200 m.$^2$/g.$^{-1}$, 4 parts of a low molecular weight hydroxylated methylphenylsiloxane and 2 parts of titanium dioxide. This mixture was then heated for 3 hours at 150° C. under vacuum to remove volatiles including traces of water and was then, after cooling, catalyzed by mixing therein 0.5 part of methyltrimethoxy-silane and 0.5 part of di(isopropoxy)titanium di-(acetoacetonate).

The product obtained was storable in sealed containers but on exposure to atmospheric humidity cured to a low modulus rubber.

Measurements of the physical properties of the rubber were made on a sample 0.125 inch thick which has been allowed to cure for 7 days at 68° F. and 65% RH. The physical properties were measured according to BS 903, Part A2 (1956), Part A7 (1957) and are shown in Table I below. The table also shows, for purposes of comparison, the physical properties measured on a similar control composition which contained 140 parts of polydimethylsiloxane (A) and none of polydimethylsiloxane (B).

TABLE 1

| | Tensile strength, lb./sq. in. | Elongation, percent | Hardness, BS° |
|---|---|---|---|
| Sample according to invention | 224 | 640 | 24 |
| Control | 261 | 438 | 24 |

An assembly was prepared by supporting a 2" x ½" x ½" bead of the curable composition between a 2" x 2" x ¼" plate of glass and an aluminum plate of similar dimensions. After the composition had been allowed to cure for 7 days at 68° F. and 65% RH, the assembly was placed in a horizontal tensometer and the rubber bead stretched at a rate of 0.25 inch per minute. The forces at 50%, 100% and 150% extensions were recorded and are shown in Table 2 which also contains comparative results measured on a control sample of the composition containing 140 parts of polydimethylsiloxane (A) and none of polydimethylsiloxane (B).

TABLE 2

| | Extension | | |
|---|---|---|---|
| | 50%, lb. | 100%, lb. | 150% |
| Sample according to invention | 26 | 39 | 51 lb. (held at 150% extension for 24 hrs.). |
| Control | 50 | 75 | Bead pulled away from plate. |

EXAMPLE 2

By the reaction of octamethylcyclotetrasiloxane (100 parts), water (0.09 part) and decamethyltetrasiloxane (0.10 part) in the presence of an acidic siloxane polymerization catalyst, a polydimethylsiloxane was obtained containing as the terminal groups both silanol groups and trimethylsilyl groups. The viscosity of the polydimethylsiloxane was approximately 4000 cs. at 25° C. This polydimethylsiloxane (100 parts) was then reacted with methyltrimethoxysilane (5 parts), the reaction mixture thereafter being stripped to remove volatile materials and excess of the silane reactant. The product was a mixture of polydimethylsiloxanes of viscosity approximately 8000 cs. at 25° C. and having as the terminal groups both methyldimethoxysilyl groups and trimethylsilyl groups, the trimethylsilyl groups constituting about 14 percent of the total terminal groups.

This mixture of polydimethylsiloxanes (100 parts) was then compounded with a fume silica (10 parts), a low molecular weight hydroxylated methylphenylpolysiloxane (2.9 parts) and titanium dioxide (1.5 parts) and the resulting composition heated for 6 hours at 150° C. under vacuum to remove traces of water. When cool, 100 parts of the product was catalyzed by the addition thereto of a mixture of di-isopropoxytitanium di(ethylacetoacetate) (0.6 part) and methyltrimethoxysilane (0.5 part).

The catalyzed product was found to be stable on storage in the absence of moisture. When samples of the catalyzed product were exposed to the atmosphere (22° C. and RH 60%) a cured skin was formed thereon after approximately 30 minutes. After 7 days the samples had cured to a depth of 1.3 cm.

Physical properties of the cured samples measured according to the methods given in Example 1 were as follows:

Tensile strength—17.5 kg./cm.$^2$
Elongation—600%
Hardness—25° BS

That which is claimed is:

1. An organosilicon composition which is stable under anhydrous conditions and curable on exposure to moisture consisting essentially of (1) a polydiorganosiloxane component having a viscosity of at least 200 cs. at 25° C. and which contains (a) at least one polydiorganosiloxane in which the terminal organosilyl groups have the general formula —SiR$_a$(OR')$_{3-a}$ and (b) at least one polydiorganosiloxane having as the terminal groups both —SiR$_a$(OR')$_{3-a}$ groups and —SiR"$_3$ groups, from 2 to 40 percent of the total terminal groups in the polydiorganosiloxane component (1) being of the formula —SiR"$_3$, in said polydiorganosiloxane component (1), $a$ has a value of 0 or 1, each R and each R" represent a monovalent hydrocarbon radical, a monovalent halohydrocarbon radical or a cyanoalkyl radical, and each R' represents an alkyl radical containing less than 6 carbon atoms, and the organic radicals in the polydiorganosiloxanes (a) and (b) are selected from the group consisting of monovalent hydrocarbon radicals, monovalent halohydrocarbon radicals and cyanoalkyl radicals, and (2) a curing catalyst for the polydiorganosiloxane component (1).

2. An organosilicon composition as claimed in claim 1 wherein the polydiorganosiloxanes (a) and (b) are polydimethylsiloxanes.

3. An organosilicon composition as claimed in claim 2 wherein the polydiorganosiloxane component (1) has a viscosity in the range from 2000 to 20,000 cs. at 25° C.

4. An organosilicon composition as claimed in claim 1 wherein the R' radicals are selected from methyl and ethyl radicals.

5. An organosilicon composition as claimed in claim 1 wherein the —SiR"$_3$ groups comprise from 2 to 25 percent of the total terminal organosilyl groups in polydiorganosiloxanes (a) and (b).

6. An organosilicon composition as claimed in claim 1 wherein the catalyst (2) is a titanium chelate.

7. An organosilicon composition as claimed in claim 6 wherein the catalyst (2) is di-isopropoxytitanium di(ethylacetoacetate) or di-isopropoxytitanium di(acetoacetonate).

References Cited

UNITED STATES PATENTS

| 3,070,566 | 12/1962 | Nitzsche et al. | 260—825 |
| 3,127,363 | 3/1964 | Nitzsche et al. | 260—46.5 |
| 3,294,739 | 12/1966 | Weyenberg | 260—46.5 |
| 3,334,067 | 8/1967 | Weyenberg | 260—46.5 |

SAMUEL H. BLECH, Primary Examiner

U.S. Cl. X.R.

260—18, 37, 46.5, 448.2